June 30, 1953  W. C. WAY  2,643,644
PRESSURE GOVERNED TIME VALVE
Filed Nov. 26, 1947  2 Sheets-Sheet 1

INVENTOR.
WALTER C. WAY
BY Victor J. Evans & Co.
ATTORNEYS

June 30, 1953  W. C. WAY  2,643,644
PRESSURE GOVERNED TIME VALVE
Filed Nov. 26, 1947  2 Sheets-Sheet 2

INVENTOR.
WALTER C. WAY
BY Victor J. Evans & Co.
ATTORNEYS

Patented June 30, 1953

2,643,644

UNITED STATES PATENT OFFICE 2,643,644

PRESSURE GOVERNED TIME VALVE

Walter C. Way, Burke, Idaho

Application November 26, 1947, Serial No. 788,101

2 Claims. (Cl. 121—164)

This invention relates to a pressure governed time valve arrangement.

It is an object of the present invention to provide a valve arrangement whereby the opening and closing of a main valve can be controlled by a pressure governed time device operable by the fluid taken from the fluid main and wherein both the opening and the closing of the time valve can be regulated for different time intervals.

Other objects of the present invention are to provide a pressure governed time valve employing standard parts, simple needle valves which can be regulated, a pressure responsive device, a toggle actuating mechanism, and which is efficient in operation.

For other objects and for a better understanding of the invention, reference may be had to the following detailed description taken in connection with the accompanying drawing, in which.

Figure 1:
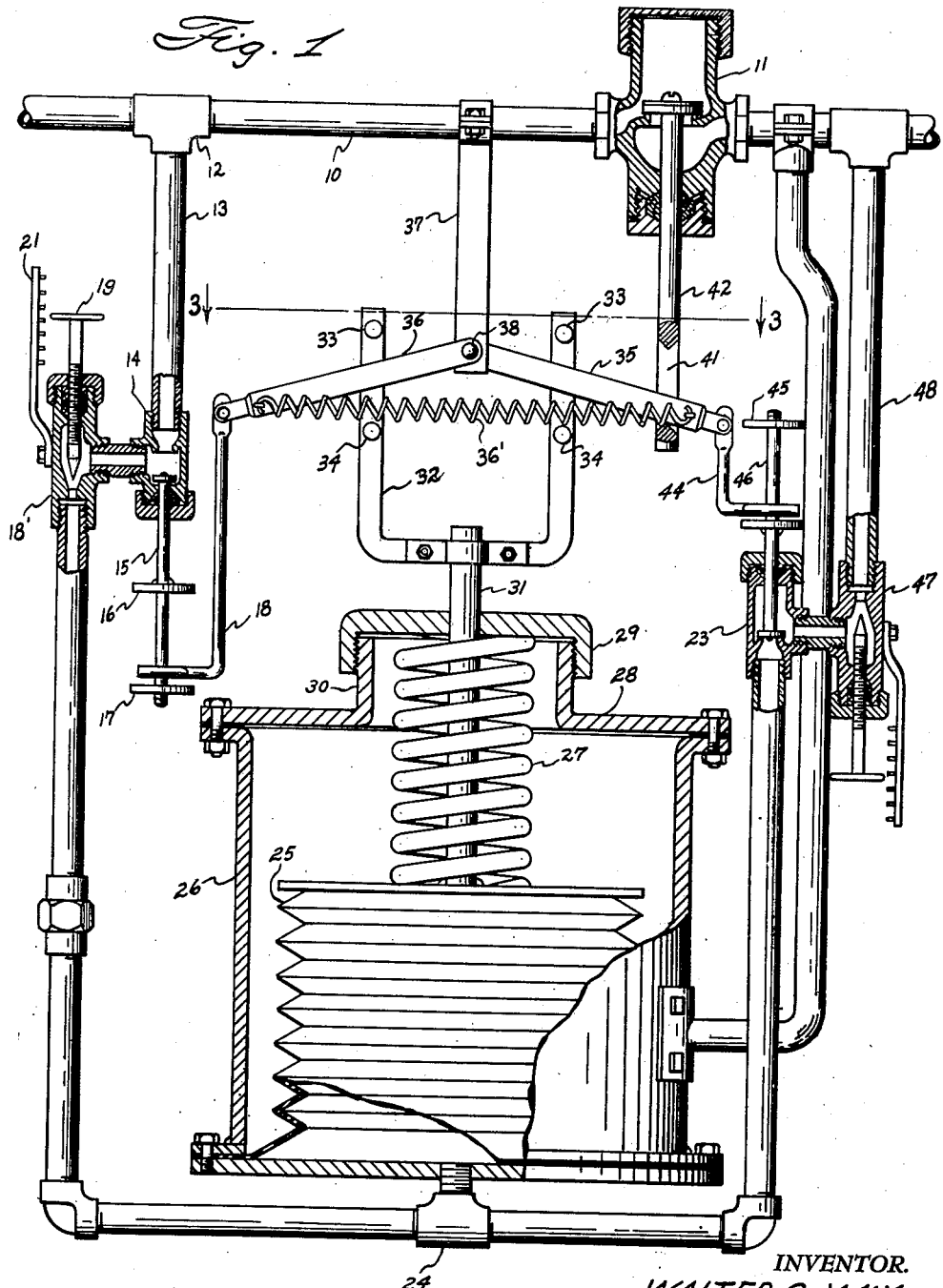
Fig. 1 is a side elevational view of the arrangement with portions of the parts broken away to show their interiors and wherein the main valve is in the closed position.
Figure 2:
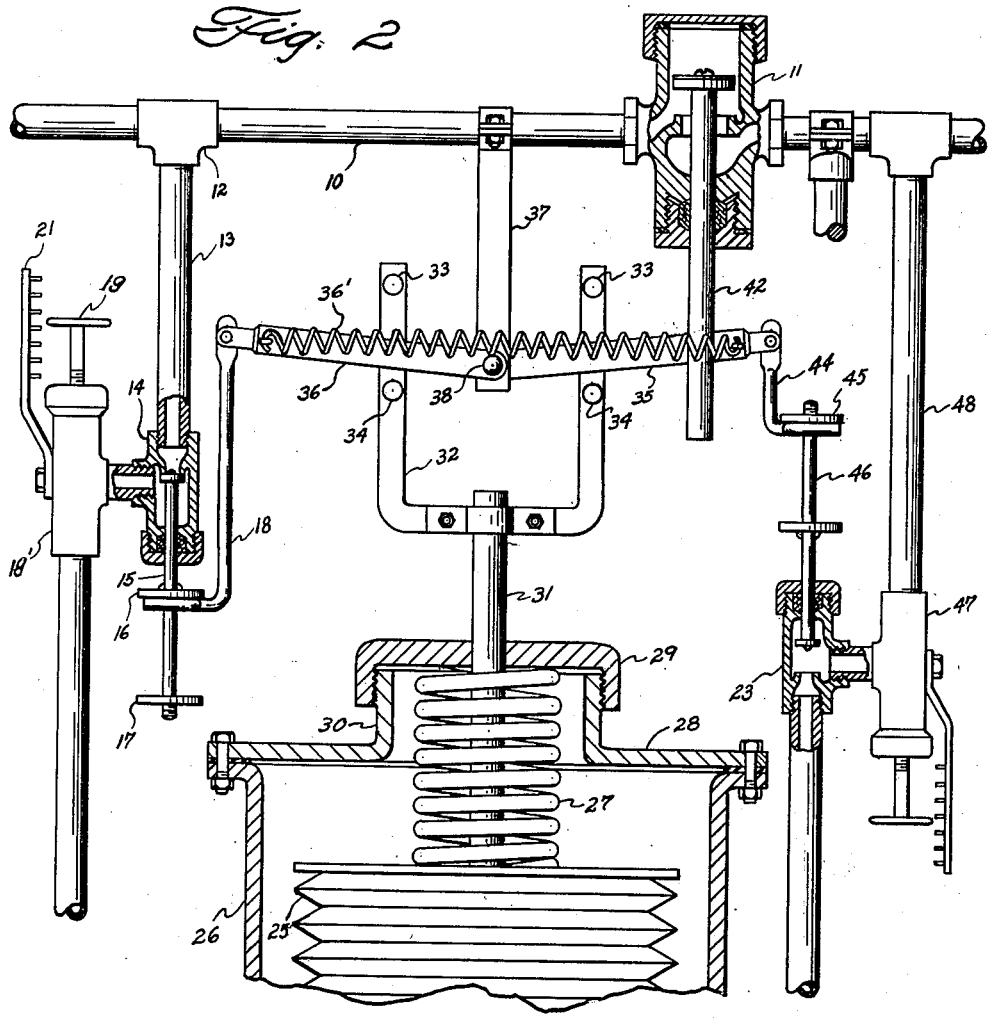
Fig. 2 is a fragmentary view similar to Fig. 1 wherein the main valve has been moved to the open position.
Figure 3:
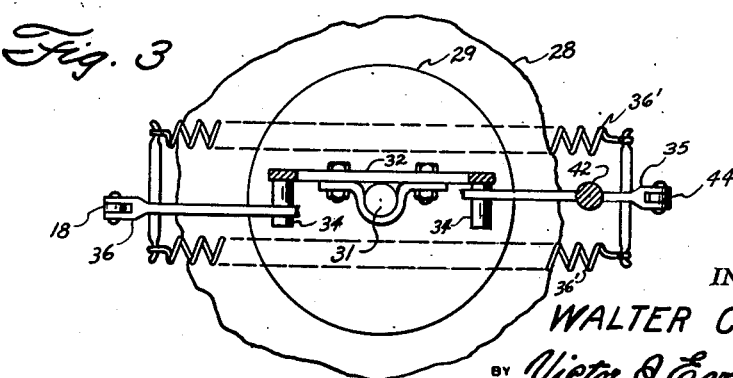
Fig. 3 is a fragmentary top plan view of the valve arrangement but with a section taken on line 3—3 of Fig. 1.

Referring now to the figures, 10 represent a main fluid pipe line in which there is disposed a main valve 11 which is to be opened and closed intermittently and automatically after predetermined time intervals have elapsed. In the pipe line is a fitting 12 from which extends a lead pipe or inlet connection 13. In the lead pipe 13 is a sliding stem type of valve 14 having a stem 15 extending therefrom. On the stem 15 are flanges 16 and 17 adapted to engage an operating member 18 in order that the valve stem 15 may be worked between open and closed position. Also in the lead pipe line 13 and connected to the valve 14 is a needle or throttle valve 18 which can be adjusted by turning needle 19. A notation of the adjustment of the needle 19 can be made with reference to an indicating scale 21 fixed on the valve 18. With the valve 14 in the open position as shown in Fig. 1 and the needle valve 19 lifted, fluid will flow through the lead pipe 13. This lead pipe 13 extends to an outlet connection with a slide valve 23 constructed similarly to the slide valve 14. This valve 23 as shown in Fig. 1, is retained in a closed position. Fluid therefor, instead of passing valve 23, moves upwardly from a fitting 24 into a bellows 25 disposed in a housing 26. As the bellows is expanded against the action of a spring 27 secured within a cover plate 28 of a housing 26 by a cover nut 29 which may be adjusted on a neck portion 30 of the cover 28 to alter the effect of the spring 27. A rod 31 will be extended upwardly through the nut 29 and will cause the upward movement of a U-shaped member 32 on its upper end. This U-shaped member has projections on the opposite legs of the same. There is a top projection 33 and a bottom projection 34 on each leg. These projections are adapted to engage with toggle links 35 and 36 pivoted on the lower end of a strap 37 depending from the main pipe line 10. A toggle spring 36' is connected between the outer ends of the links 35 and 36 in order that a snap action can be effected once the links have been thrown over center point 38. The operating member 18 is connected to the link 36. As the projections 34 engage with the lower edges of the links 35 and 36, the links 35 will be pivoted upwardly and operating member 18 will engage flange 16 on the stem 15 of the valve 14 whereby to cause the valve 14 to be closed.

The toggle link 35 extends through an opening 41 in a valve stem 42 extending from the valve 11. Accordingly, as the link 35 is elevated it will engage the upper end of the opening 41 to cause the stem 42 to be lifted so as to continue the flow of fluid through the main pipe line 10.

On the end of the link 35 is an operating member 44 which at the same time that the link 35 is elevated to open the valve 11, will engage with a flange 45 on a stem 46 of the valve 23 so as to open the valve 23 and permit the outward flow of fluid from the bellows 25 under the action of the spring 27. This flow will take place in a given time as determined by the adjustment of needle valve 47 connected by a pipe 48 with the main pipe line at the outlet end of the valve 11.

As the toggle links 35 and 36 are brought downwardly by the engagement of projection 33 with the upper edges of the same after a predetermined time interval and to the position shown in Fig. 1, the main valve 11 will again be closed and the slide valve 14 open. At the same time the valve 23 will again be closed.

It will thus be apparent that the opening and closing of the main valve 11 is entirely automatic and responsive to the fluid passing through the main line in which the valve 11 is disposed. It will be further apparent that the time interval can be adjusted for both the opening and the closing.

While various changes may be made in the detail construction, it shall be understood that such changes shall be within the spirit and scope of the present invention as defined by the appended claims.

I claim:

1. In a continuously actuated motor, the combination which comprises a horizontally disposed main pipe line, an enclosed vertically disposed housing positioned below said main pipe line, a bellows in said housing, a rod extended from the bellows upwardly through the upper end of the housing, a U-shaped member having spaced upwardly extended legs mounted on the upper end of the rod, a strip for use on a main pipe line and adapted to be positioned in alinement with the rod extended from the bellows and whereby the extended end thereof extends downwardly, toggle acting levers pivotally mounted on the said strip, inlet and outlet connections extended from the housing and communicating with the interior of the bellows therein, valves in said connections, means actuating said toggle acting levers by the legs of the U-shaped member extended upwardly from the rod extended from the bellows, means closing the valve of the inlet connection and opening the valve of the outlet connection as the rod extended upwardly from the bellows reaches the limit of its upward movement, a spring in the housing for urging the bellows and rod extended therefrom downwardly, means actuating the valves of the inlet and outlet connections by the toggle levers whereby the valve of the inlet connection is opened and the valve of the outlet connection closed as the said rod reaches the end of its downward travel, said inlet and outlet connections extended to said main pipe line and connected thereto at points on opposite sides of a main valve of the main pipe line, means for actuating said main valve with one of said toggle levers, and adjusting valves in the said inlet and outlet connections for regulating the flow of fluid through the said connections.

2. In a continuously actuated motor, the combination which comprises a horizontally disposed main pipe line, an enclosed vertically disposed housing positioned below said main pipe line, a bellows in said housing, a rod extended from the bellows upwardly through the upper end of the housing, a U-shaped member having spaced upwardly extended legs mounted on the upper end of the rod, a strip for use on a main pipe line and adapted to be positioned in alinement with the rod extended from the bellows and whereby the extended end thereof extends downwardly, toggle acting levers pivotally mounted on the said strip, a spring extended across and connected to the ends of the said levers, inlet and outlet connections extended from the housing and communicating with the interior of the bellows therein, valves in said connections, means actuating said toggle acting levers by the legs of the U-shaped member extended upwardly from the rod extended from the bellows, means closing the valve of the inlet connection and opening the valve of the outlet connection as the rod extended upwardly from the bellows reaches the limit of its upward movement, a spring in the housing for urging the bellows and rod extended therefrom downwardly, means actuating the valves of the inlet and outlet connections by the toggle levers whereby the valve of the inlet connection is opened and the valve of the outlet connection closed as the said rod reaches the end of its downward travel, adjusting valves in the said inlet and outlet connections for regulating the flow of fluid through the said connections, and a yoke extended over one of the said toggle levers and adapted to be attached to a main valve of the main pipe line to which the said inlet and outlet connections are connected for alternately opening and closing the said main valve.

WALTER C. WAY.

References Cited in the file of this patent

UNITED STATES PATENTS

| Number | Name | Date |
|--------|------|------|
| 533,817 | Kenan | Feb. 5, 1895 |
| 928,459 | Kieselhorst | July 20, 1909 |
| 1,458,922 | Rivera | June 12, 1923 |
| 1,772,578 | Harford | Aug. 12, 1930 |
| 1,921,698 | Price | Aug. 8, 1933 |
| 2,037,492 | Arnold | Apr. 14, 1936 |
| 2,080,695 | Cargile | May 18, 1937 |
| 2,229,829 | Watson | Jan. 28, 1941 |
| 2,251,323 | Burke | Aug. 5, 1941 |
| 2,289,463 | Schlosser | July 14, 1942 |